US006576290B2

(12) United States Patent
Cordaro et al.

(10) Patent No.: US 6,576,290 B2
(45) Date of Patent: Jun. 10, 2003

(54) METHOD OF PREPARATION OF AN ELECTRICALLY CONDUCTIVE PAINT

(75) Inventors: James F. Cordaro, Ridgecrest, CA (US); Lynn E. Long, Manhattan Beach, CA (US)

(73) Assignee: The Boeing Company, Seattle, WA (US)

( * ) Notice: Subject to any disclaimer, the term of this patent is extended or adjusted under 35 U.S.C. 154(b) by 25 days.

(21) Appl. No.: 09/855,234

(22) Filed: May 14, 2001

(65) Prior Publication Data

US 2002/0168474 A1 Nov. 14, 2002

(51) Int. Cl.[7] ............................................... B05D 5/12
(52) U.S. Cl. ................................... 427/201; 427/372.2
(58) Field of Search ............................... 427/372.2, 201

(56) References Cited

U.S. PATENT DOCUMENTS

| 4,111,851 A | * | 9/1978 | Shai ........................ 106/426 |
| 5,807,909 A | | 9/1998 | Cordaro et al. ............ 523/179 |
| 5,820,669 A | | 10/1998 | Cordaro ..................... 106/635 |
| 5,884,868 A | * | 3/1999 | Long et al. ............ 244/158 A |
| 6,099,637 A | | 8/2000 | Cordaro ..................... 106/635 |
| 6,124,378 A | | 9/2000 | Cordaro et al. ............ 523/179 |

FOREIGN PATENT DOCUMENTS

| DE | 43 32 832 A1 | | 3/1995 |
| FR | 2 761 048 A | | 9/1998 |
| JP | 57-063365 | * | 4/1982 |
| WO | WO 93/09187 A | | 5/1993 |

OTHER PUBLICATIONS

Guillaumon, Eur. Space Agency, Spec. Publ., ESA SP, ESA SP–178, Spacecraft Mater. Space Environ., pp. 21–6, 1982.*
Hribar et al, Int. SAMPE Symp. Exhib., 31(Mater. Sci. Future), pp. 1113–1127, 1986.*
Hribar et al, Int. SAMPE Tech. Conf., 18(Mater. Space–Gathering Momentum), pp. 272–286, 1986.*
Hsieh et al, Int. SAMPE Symp. Exhib., 39, pp. 1679–1693, 1994.*

* cited by examiner

Primary Examiner—Erma Cameron

(57) ABSTRACT

A paint is prepared by first preparing a pigment mixture by the steps of providing an electrically conductive paint pigment, providing an aqueous paint vehicle, and mixing and milling the paint pigment and the paint vehicle to reduce a particle size of the paint pigment and to form a pigment mixture. A liquid paint is thereafter prepared by the steps of providing an inorganic paint binder, and mixing and dispersing the pigment mixture in the paint binder without substantially reducing the particle size of the paint pigment. The liquid paint is thereafter applied to a surface and dried to form a solid paint.

20 Claims, 2 Drawing Sheets

METHOD OF PREPARATION OF AN ELECTRICALLY CONDUCTIVE PAINT

This invention relates to an electrically conductive paint and, more particularly, to the preparation of such a paint.

BACKGROUND OF THE INVENTION

Spacecraft are subjected to a wide range of thermal environments during service. One side of the spacecraft may face the blackness of free space, while the other side faces the sun. Heat is radiated into free space to cool the spacecraft, but the spacecraft is heated intensively in direct sunlight.

Active and passive temperature control techniques are used to maintain the interior temperature of the spacecraft, which contains persons or sensitive instruments, within acceptable operating limits. Active temperature control usually involves machinery or electrical devices, such as electrical heaters, electrical coolers, and heat pipes. The present invention deals with passive temperature control, where no machinery or electrical devices are used.

An established approach to passive temperature control is the use of surface coatings, typically termed "paints", on the external surface of the spacecraft. A white paint, for example, has a low solar absorptance, while a black paint has a high solar absorptance. The selective application of such paints to various elements of the spacecraft exterior greatly aids in controlling its temperature.

The paint must also dissipate electrostatic charges that develop on the external surface of the spacecraft, as well as provide passive thermal control. The charges would otherwise accumulate to cause arcing and possible damage to, or interference with, sensitive electronic equipment on or in the spacecraft. In order to dissipate electrostatic charge, the paint must be somewhat electrically conductive, with a surface-resistivity on the order of about 109 ohms per square or less.

There are white, electrically conductive paints known for spacecraft use. Examples are found in U.S. Pat. Nos. 5,807,909; 5,820,669; 6,099,637; and 6,124,378. These paints are highly successful in a number of applications. There is, however, always a desire to improve the performance and manufacturing technology of such specialty paints. The present invention provides such an improvement.

SUMMARY OF THE INVENTION

The present approach provides an improvement to the processing of electrically conductive, electrostatic-dissipative paints, particularly white paints. The improved processing yields significantly better performance than prior processing approaches, at no added cost and without modifying the chemical composition of the paint. The performance is improved in respect to the application and coverage properties of the paint, the electrical performance, and the resistance to radiation damage, while maintaining excellent optical properties.

In accordance with the invention, a method for preparing a paint comprises the step of preparing a pigment mixture by the steps of providing an electrically conductive paint pigment, providing a paint vehicle, and mixing and milling the paint pigment and the paint vehicle to form a pigment mixture. Thereafter, a liquid paint is prepared by the steps of providing an inorganic paint binder, and mixing and dispersing the pigment mixture in the paint binder, without substantial milling of the pigment mixture in contact with the paint binder. The liquid paint may be applied to a surface, such as a portion of a spacecraft, and dried to form a solid paint.

The approach is applicable to a number of electrically conductive paint pigments and paints made from those pigments. The preferred paint pigments have a composition of $A[xAl(1-x)Ga]_2O_4(\delta D)$, wherein A is selected from the group consisting of zinc, cadmium, and magnesium, D is a dopant selected from the group consisting of a cationic dopant having an ionic valence greater than +2 and an anionic dopant, the value of x is from 0 to 1, and the value of $\delta$ is from 0 to about 0.2. The paint vehicle is preferably water. The inorganic paint binder is preferably potassium silicate.

A key feature of the present invention is that the inorganic paint binder is not milled with the pigment. In a prior approach, termed a "one-step" approach, the paint pigment, paint vehicle, and inorganic paint binder were mixed together and milled together. In the present approach, termed a "two-step" approach, the paint pigment and paint vehicle are milled together, and this milled mixture is thereafter mixed with and dispersed into the paint binder without substantial further milling of the paint pigment. It has been found that the milling of the paint pigment with the inorganic paint binder in the one-step process has an adverse effect on the properties of the paint, which are avoided in the two-step process.

Thus, it is preferred that the mixing and dispersing step, when the paint pigment is in contact with the inorganic paint binder, be performed without substantially reducing the particle size of the paint pigment. It has been determined that inorganic paint binders, particularly potassium silicate paint binders, may attack the surfaces of the particles of the paint pigment during mechanical milling, leading to adverse effects on the electrical properties and other properties of the final paint. To avoid such influences, any substantial reduction in the particle size of the paint pigment occurs during the mixing and milling step when the paint pigment is not contacted by the inorganic paint binder.

The present approach achieves significant improvements in the properties of the final paint by avoiding the milling of the paint pigment in the presence of the paint binder. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
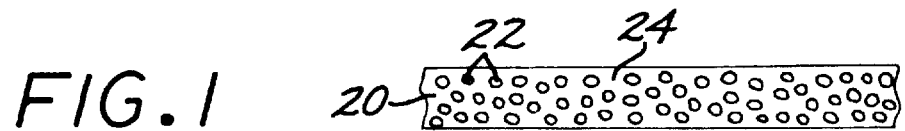
FIG. 1 is a side elevational view of a paint layer.

FIG. 1 illustrates a paint layer 20 prepared according to the invention. The paint layer 20 comprises pigment particles 22 mixed with a paint binder 24. Prior to drying, a paint vehicle is also present, but the paint vehicle is evaporated during the drying operation. The preparation of the paint layer will be described in greater detail subsequently.

Figure 2:
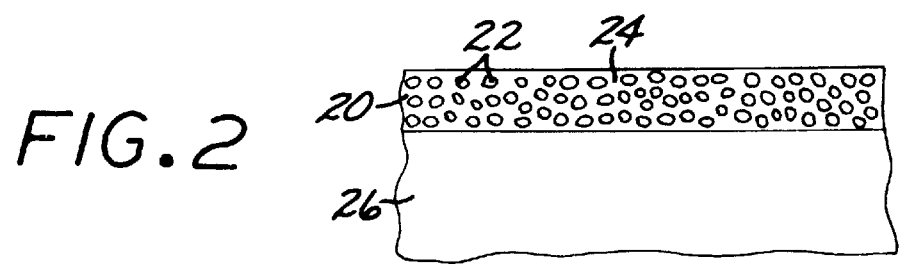
FIG. 2 is a side elevational view of the paint layer of FIG. 1, as applied to a substrate.
Figure 3:
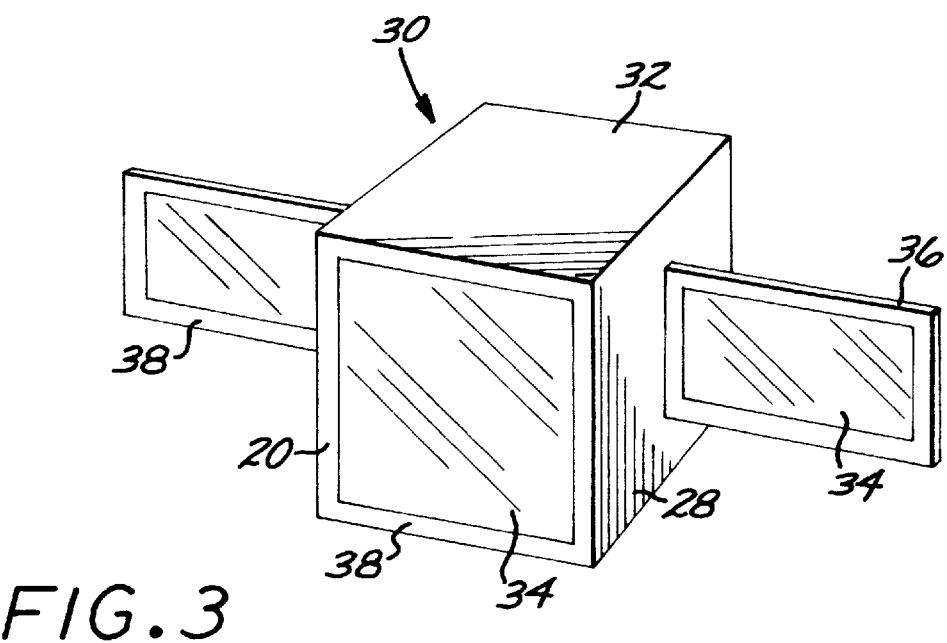
FIG. 3 is a perspective view of a spacecraft having a paint layer applied thereto.

FIG. 2 illustrates the paint layer 20 applied to a substrate 26. The paint may be used in any thermal control application which also requires electrical conductivity in the paint to accomplish charge dissipation. Most preferably, it is used as a coating on a spacecraft, such as a satellite 30 illustrated in FIG. 3. The spacecraft 30, here depicted as a communications satellite that is positioned in geosynchronous orbit when in service, has a body 32 with solar panels 34 mounted either on the body 32 or on wings 36 that extend outwardly from the body 32, or both. The body 32 and wings 36 have a skin 38 which may be made of a metal, a nonmetal, or a composite material, and which may be supported by an underlying skeletal structure. At least some of those outwardly facing portions of the skin 38 of the body 32 and/or the wings 36 which are not solar panels are covered with the layer 20 of the paint, as described above, first in liquid form and then dried to solid form. (As used herein, a "liquid" paint is a paint in a fluid, slurried form containing solid pigment particles.) The skin of the spacecraft thereby serves as the substrate 26 to which the paint layer 20 is applied. The paint layer 20 provides the covered portions with passive thermal control and electrostatic charge dissipation. The paint is sufficiently durable and stable in its properties for use on extended missions of 15 years or more.

Figure 4:
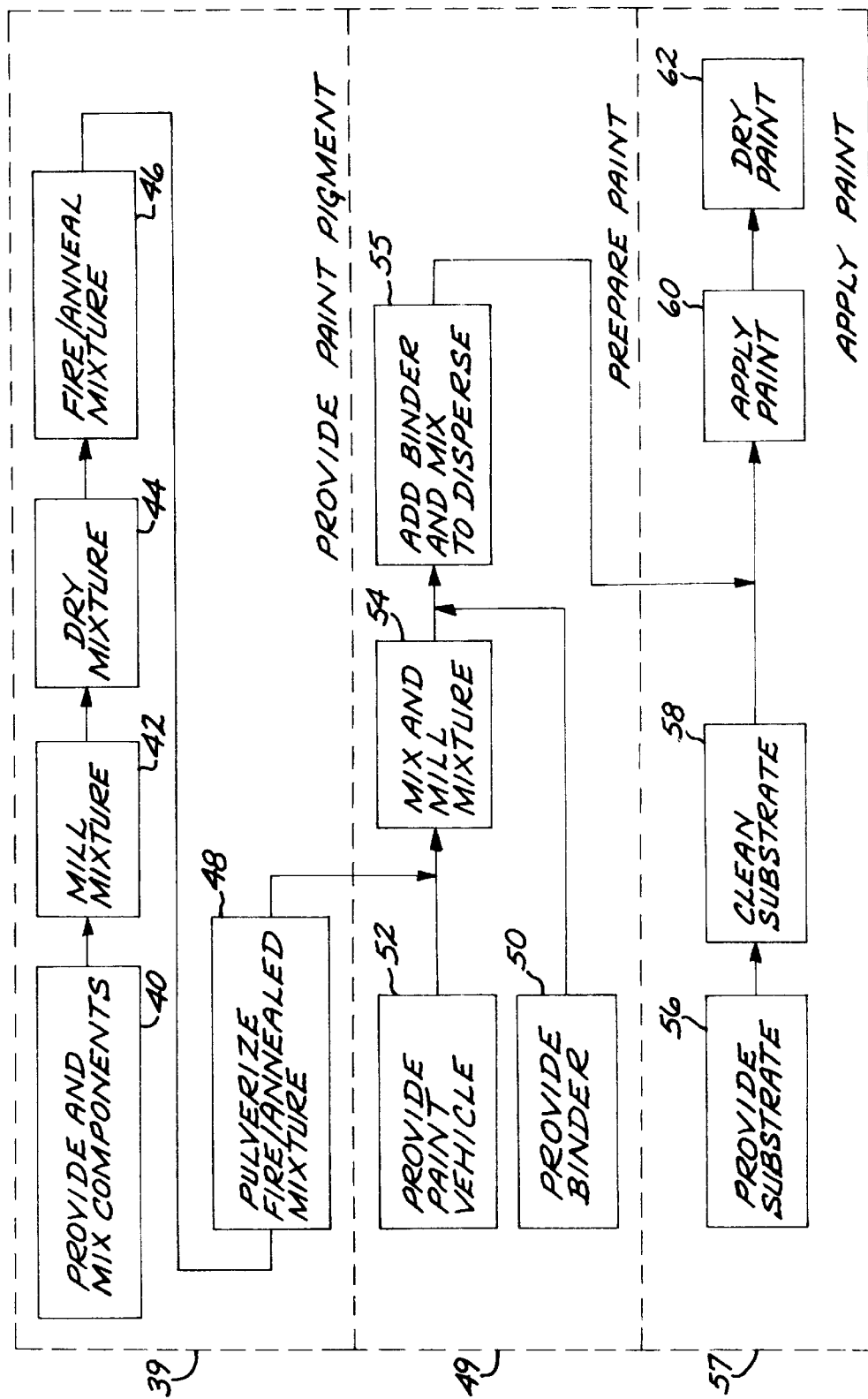
FIG. 4 is a block diagram of a method for the preparation of a white paint according to the invention, and the painting of a substrate.

FIG. 4 depicts a preferred method for preparing the particles 22, for preparing the paint material used in the paint layer 20, and for painting the substrate.

The electrically conductive paint pigment is provided, numeral 39. To prepare the pigment or particles 22, the components are provided and mixed together, numeral 40. The details of the preparation of the paint pigment are described for the most preferred pigment, the M2 material. In a general form, the M2 pigment particles have a composition given by $A[xAl (1-x)Ga]_2O_4(\delta D)$. A is zinc (preferred), cadmium or magnesium, D is a cationic dopant having an ionic valence greater than +2 or an anionic dopant, the value of x is from 0 to 1, and the value of δ is from 0 to about 0.2 (i.e., 20 atomic percent). The dopant D, where present, is preferably indium, supplied as indium oxide. The composition of the particles is selected from this formulation, and may be any composition within this range. These compositions are discussed more fully in U.S. Pat. Nos 5,820,669 and 6,099,637.

In the preferred formulation procedure, readily available components ZnO, $Al_2O_3$ $Ga_2O_3$, and $In_2O_3$ are used as starting materials. Thus, to prepare $ZnAl_2O_4$, the appropriate amounts of ZnO and $Al_2O_3$ are mixed together. To prepare $ZnGa_2O_4$, the appropriate amounts of ZnO and $Ga_2O_3$ are mixed together. To prepare $Zn[xAl (1-x)Ga]_2O_4$, the appropriate amounts of ZnO, $Al_2O_3$, and $Ga_2O_3$ are mixed together. If any of these compositions is to be doped with indium, the appropriate amount of $In_2O_3$ is added to the mixture. A mixing medium, which later is removed, may be added to promote the mixing of the components. Preferably, water is used as the mixing medium.

The components and the mixing medium are milled together to form a mechanical mixture, numeral 42. After milling is complete, the mixing medium is removed by evaporation, numeral 44.

The dried mixture is fired to chemically react the components together, numeral 46, at a temperature that is preferably in the range of from about 1000° C. to about 1300° C. A preferred firing treatment is 1170° C. for 6 hours, in air. The mixture is thereafter optionally annealed after the firing at a slightly lower temperature, for example 1000° C. for several hours. The optional annealing affects the degree of normal-inverse spinel disordering.

After cooling, the agglomerated mass resulting from the firing/annealing is lightly pulverized, as with a mortar and pestle, numeral 48. The resulting particulate has a size range of from about 0.1 millimeters to about 5 millimeters. The preparation of the particulate pigment is complete.

To prepare the paint, numeral 49, a paint vehicle is provided to form a solution or a slurry with the pigment particles, numeral 52. One preferred paint vehicle is water, which does not have adverse environmental impacts when later evaporated. The amount of the paint vehicle is selected to provide a consistency that will permit application of the paint by the desired approach. For example, application by spraying requires the use of more of the paint vehicle than application by brush or roller.

The pigment particles and the paint vehicle are mixed together and milled together, numeral 54, to form a pigment mixture. In mixing, components are mechanically combined, blended, and interspersed to form a mixture. In milling, pigment particles are fractured to create smaller particles and new surface area. It is critical that substantially no paint binder be present in the mixture of paint particles and the paint vehicle that is milled in step 54, because the paint binder can chemically and physically interact with the newly created surfaces of the pigment particles to adversely affect the electrically conductive properties of the final paint. The mixing and milling of the pigment particles and the paint vehicle reduces the mean particle size by fracturing of solid particles, breaking down of aggregates, and breaking down of agglomerates. The mixing and milling is continued until the mean particle size is less than about 12 micrometers, or a Hegman grind of at least 7 on the Hegman grind scale, which is typically from about 1 to about 8 hours. The milling of the slurry reduces the particles to the desired size, which is difficult in the absence of a liquid, and also wets the paint vehicle to the particles.

An inorganic paint binder is provided, numeral 50, to adhere the particles together in the final product. The paint binder is selected to provide good adherence of the particles to each other and of the particles to the underlying substrate, with acceptable physical properties. The paint binder must withstand the environment to which the paint is exposed, such as a space environment. A preferred inorganic paint binder for space applications is potassium silicate (potassium salt of silicic acid), but other inorganic paint binders such as sodium silicate and mixtures of potassium silicate and sodium silicate may be used as well. The paint binder is present in an operable amount. In a typical case, the paint binder is present in an amount such that the ratio, by weight, of the total of all of the particulate to the paint binder is about 5:1 or less. If the ratio is more than about 5:1, the critical pigment volume concentration (CPVC) may be exceeded, the paint has insufficient mechanical strength, and the paint falls apart when dried. Preferably, the ratio by weight of particles to paint binder is from about 3:1 to about 5:1.

After the pigment particles and the paint vehicle are mixed and milled together in step 54, the paint binder is added to the mixed-and-milled mixture of the pigment particles and the paint vehicle, numeral 55. The newly formed mixture is further mixed to disperse the pigment particles throughout the paint binder and the paint vehicle. There is substantially no milling of the pigment particles that reduces the size of the pigment particles and creates new surface area in step 55, although some minor incidental milling is permitted. The mixing and dispersing typically requires from about 10 to about 20 minutes of mixing with a mixing medium present.

The preparation of the liquid electrically conductive paint is complete.

The liquid paint is applied, numeral 57. The substrate 26 to be coated is provided, numeral 56, and cleaned, numeral 58. There is no known limitation on the type of substrate. The surface of the substrate is cleaned by any operable technique, such as the preferred sequential steps of washing and scouring in a detergent solution, rinsing in tap water, rinsing in de-ionized water, and drying in air.

The paint is applied to the surface of the substrate, numeral 60. At the outset of the application, the surface of the substrate may be primed to improve the adhesion of the paint. Priming is preferred for application of the paint containing an inorganic paint binder to metallic surfaces such as aluminum. Preferably, the priming, if used, is accomplished by rubbing a small amount of the liquid paint into the surface using a clean cloth, to achieve good contact to the surface.

The paint layer is thereafter applied by any operable technique, with spraying being preferred. As indicated earlier, the amount of paint vehicle present in the paint is selected to permit application by the preferred approach. At this point, the paint is a thin film of a liquid material.

The paint may also be applied by a plasma spray technique or the like wherein the mixture of pigment and paint binder is supplied to a heated region such as a plasma and directed toward the substrate. The plasma-heated mixture of pigment and paint binder strikes the substrate and solidifies thereon.

The paint is dried as necessary to leave a thin film of a solid material, numeral 62. Drying is preferably accomplished at ambient temperature with a 50 percent or greater humidity and for a time of 14 days. Drying removes the paint vehicle by evaporation. Additionally, the drying step may accomplish a degree of curing of any curable components, as where a curable inorganic paint binder is used. The paint layer is preferably from about 0.003 to about 0.006 inches thick.

The invention has been reduced to practice. To prepare about ½ pint of the liquid paint, 250 grams of the M2 paint pigment described above, doped with about 1.85 weight percent indium oxide (lot 9014), and 143.6 grams of deionized water were placed into a ceramic jar mill having a volume of about 0.3 gallons and were hand mixed. A 33 percent by volume charge of cylindrical ceramic milling media of ½ inch diameter size was added to the jar mill, and the lid was closed. The mixture was milled for about 115 minutes to a Hegman grind of about 7.5–8, completing step 54. Thereafter, a total of 75.8 grams of Kasil$^R$ 2135 potassium silicate paint binder solution was added to the jar mill, and the mixture was mixed for 20 minutes without substantial milling, completing step 55.

Direct comparisons were performed between paints prepared by the prior one-step preparation technique and the two-step preparation technique of the present invention. In the one-step preparation technique, the M2 pigment particles, the paint vehicle, and the inorganic paint binder were milled together, so that the pigment particles and the inorganic paint binder were in contact during milling. In the two-step preparation technique as depicted in FIG. 4, the same M2 pigment particles and the paint vehicle were milled together, and thereafter this milled mixture was combined with the paint binder and mixed to achieve dispersion but no substantial additional amount of milling of the paint pigment. That is, in the two-step preparation technique, the paint binder was not in contact with the pigment as the pigment was milled. Paints were prepared with the materials and quantities as described in the prior paragraph, except respectively using the one-step preparation technique and the two-step preparation technique.

The paints were comparatively evaluated for sprayability. Sprayability is related to the thixotropic behavior of the paint, with decreasing thixotropy being indicative of better flow properties and improved sprayability. The paints were sprayed, and the spray performance evaluated on a five step scale of 1–5, with a 1 rating being the best performance and a 5 rating being the lowest performance. The paint of lot 9014 prepared by the one-step process had a substantial degree of variability but averaged 2.5 in several trials, and the paint prepared by the two-step process consistently rated 1. The paint prepared by the two-step approach was much smoother, and the thickness of the paint layer was easier to control, than the paint prepared by the one-step process. The paint prepared by the two-step process is more uniform and has better adhesion to the substrate than the paint prepared by the one-step process. The paint prepared by the two-step process is thus superior in commercial application practice to that prepared by the one-step process.

Paints prepared by the one-step process were evaluated for sprayability as a function of small variations in the chemical composition of the paint pigment. Several batches of paint of the same nominal composition were prepared by the one-step process, and several other batches of paint of that same nominal composition were prepared by the two-step process. Even though the various lots of paint were all prepared to the same nominal compositions, there were slight differences on the order of 0.1–1.0 percent compositional variations as a result of normal laboratory practices. For the paint prepared by the one-step process, the sprayability of the paint varied from batch to batch over the entire range of 1–5. For the paint prepared by the two-step process, the sprayability of the paint was substantially the same from batch to batch at a rating of 1. This result is important for commercial utilization of the paint. The paint prepared by the two-step process is insensitive to minor variations in composition of the paint pigment. Manufacturing spray operations may be optimized and remain unchanged for various batches of paint.

The optical performance of the M2 paint pigment of lot 9014 was evaluated for paint prepared by the two-step process and the one-step process. The one-step process paint layer of dried thickness 0.038 inch had a solar absorptance of 0.091. The two-step process paint of dried thickness 0.035 inch had a solar absorptance of 0.086, a small improvement.

The ESD electrical performance of the M2 pigment-based paints prepared by the one-step process and the two-step process were compared in conditions simulating the near-worst-case radiation storm environment of a geosynchronous earth orbit. As a measure of electrical performance, the surface voltage of the paint was measured while the specimen was subjected to radiation-storm environments at the 95 and 99 percentiles. (That is, at the 99 percentile, 99 percent of radiation-storm environments are less severe.) The surface voltages measured for the paint prepared by the two-step process were measured to be $1/3$–$1/4$ of those measured for the paint prepared by the one-step process in both radiation-storm environments, a dramatic improvement resulting from the use of the two-step process to prepare the pigment.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for preparing a paint, comprising the steps of:
    preparing a pigment mixture by the steps of
        providing an electrically conductive paint pigment,
        providing a paint vehicle, and
        mixing and milling the paint pigment and the paint vehicle to form a pigment mixture; and thereafter
    preparing a liquid paint by the steps of
        providing an inorganic paint binder, and
        mixing and dispersing the pigment mixture in the paint binder, without substantial milling of the pigment mixture in contact with the paint binder.

2. The method of claim 1, wherein the step of providing an electrically conductive paint pigment includes the step of
    providing pigment particles having a composition of $A[xAl(1-x)Ga]_2O_4(\delta D)$, wherein A is selected from the group consisting of zinc, cadmium, and magnesium, D is a dopant selected from the group consisting of a cationic dopant having an ionic valence greater than +2 and an anionic dopant, the value of x is from 0 to 1, and the value of $\delta$ is from 0 to about 0.2.

3. The method of claim 1, wherein the paint vehicle is water.

4. The method of claim 1, wherein the paint binder comprises potassium silicate.

5. The method of claim 1, including additional steps of
    applying the liquid paint to a surface, and
    drying the liquid paint to form a solid paint.

6. The method of claim 5, wherein the surface is a portion of a spacecraft.

7. The method of claim 1, wherein there is substantially no reduction in the particle size of the paint pigment during the step of mixing and dispersing.

8. A method for preparing a paint, comprising the steps of:
    preparing a pigment mixture by the steps of
        providing an electrically conductive paint pigment,
        providing a paint vehicle comprising water, and
        mixing and milling the paint pigment and the paint vehicle to reduce a particle size of the paint pigment and to form a pigment mixture; and thereafter
    preparing a liquid paint by the steps of
        providing an inorganic paint binder, and
        mixing and dispersing the pigment mixture in the paint binder without substantially reducing the particle size of the paint pigment.

9. The method of claim 8, wherein the step of providing an electrically conductive paint pigment includes the step of
    providing pigment particles having a composition of $A[xAl(1-x)Ga]_2O_4(\delta D)$, wherein A is selected from the group consisting of zinc, cadmium, and magnesium, D is a dopant selected from the group consisting of a cationic dopant having an ionic valence greater than +2 and an anionic dopant, the value of x is from 0 to 1, and the value of $\delta$ is from 0 to about 0.2.

10. The method of claim 8, wherein the paint binder comprises potassium silicate.

11. The method of claim 8, including additional steps of
    applying the liquid paint to a surface, and
    drying the liquid paint to form a solid paint.

12. The method of claim 11, wherein the surface is a portion of a spacecraft.

13. The method of claim 1, wherein a ratio of paint pigment to paint binder is less than about 5:1 by weight.

14. A method for preparing a paint, comprising the steps of:
    preparing a pigment mixture by the steps of
        providing an electrically conductive paint pigment including pigment particles having a composition of $A[xAl(1-x)Ga]_2O_4(\delta D)$, wherein A is selected from the group consisting of zinc, cadmium and magnesium, D is a dopant selected from the group consisting of a cationic dopant having an ionic valence greater than +2 and an anionic dopant, the value of x is from 0 to 1, and the value of $\delta$ is from 0 to about 0.2,
        providing a paint vehicle, and
        mixing and milling the paint pigment and the paint vehicle to form a pigment mixture; and thereafter
    preparing a liquid paint by the steps of
        providing an inorganic paint binder, wherein a ratio of paint pigment to paint binder is less than about 5:1 by weight, and
        mixing and dispersing the pigment mixture in the paint binder, without substantial milling of the pigment mixture in contact with the paint binder.

15. The method of claim 14, wherein the paint vehicle is water.

16. The method of claim 14, wherein the paint binder comprises potassium silicate.

17. The method of claim 14, wherein the step of mixing and milling includes the step of
    mixing and milling the paint pigment and the paint vehicle to reduce a particle size of the paint pigment and to form a pigment mixture.

18. The method of claim 14, including additional steps of
    applying the liquid paint to a surface, and
    drying the liquid paint to form a solid paint.

19. The method of claim 18, wherein the surface is a portion of a spacecraft.

20. The method of claim 14, wherein there is substantially no reduction in the particle size of the paint pigment during the step of mixing and dispersing.

* * * * *